United States Patent
Clais et al.

(10) Patent No.: US 7,939,037 B2
(45) Date of Patent: May 10, 2011

(54) METHOD OF PRODUCING ZINC OXIDE POWDER

(75) Inventors: Kevin Clais, Tournai (BE); Duncan Turner, Herfelingen (BE); Philippe Leblanc, Maffe (BE); Antoine Masse, Tournai (BE)

(73) Assignee: Zincox Resources PLC, Surrey (GB)

( * ) Notice: Subject to any disclaimer, the term of this patent is extended or adjusted under 35 U.S.C. 154(b) by 0 days.

(21) Appl. No.: 12/451,316

(22) PCT Filed: May 6, 2008

(86) PCT No.: PCT/EP2008/055547
§ 371 (c)(1),
(2), (4) Date: Nov. 6, 2009

(87) PCT Pub. No.: WO2008/135574
PCT Pub. Date: Nov. 13, 2008

(65) Prior Publication Data
US 2010/0086455 A1    Apr. 8, 2010

(30) Foreign Application Priority Data
May 7, 2007  (EP) .................................... 07107624

(51) Int. Cl.
*C01G 9/00*    (2006.01)

(52) U.S. Cl. ........ 423/101; 423/102; 423/103; 423/104; 423/105; 423/106; 423/109; 423/622; 241/5; 241/15; 241/16; 241/17; 241/21

(58) Field of Classification Search .......... 423/101–106, 423/109, 622; 241/5, 15–17, 21
See application file for complete search history.

(56) References Cited

U.S. PATENT DOCUMENTS

| | | | |
|---|---|---|---|
| 1,944,158 A * | 1/1934 | French .......................... | 423/109 |
| 2,147,379 A   | 2/1939 | Pearlman | |
| 4,071,357 A * | 1/1978 | Peters ........................... | 423/105 |
| 5,759,503 A * | 6/1998 | Myerson et al. .............. | 423/101 |

FOREIGN PATENT DOCUMENTS

| | | |
|---|---|---|
| DE | 2 042 963 | 3/1972 |
| WO | WO 98/36102 | 8/1998 |

* cited by examiner

*Primary Examiner* — Steven Bos
(74) *Attorney, Agent, or Firm* — McCracken & Frank LLP

(57) ABSTRACT

Method for producing hydrometallurgical zinc oxide powder having characteristics equivalent to that derived from a French process, comprising formation of an aqueous pulp from a starting zinc oxide having particles of nodular structure, wet milling of this aqueous pulp, separation in this milled pulp between a liquid phase and a solid phase containing the zinc oxide, and drying of said solid phase, coupled with a mechanical deagglomeration of the particles during drying, to obtain a dry zinc oxide powder with particles of nodular structure having a particle size distribution where the particles have an average size (d50) between 0.02 and 20 μm.

16 Claims, 2 Drawing Sheets

METHOD OF PRODUCING ZINC OXIDE POWDER

BACKGROUND OF THE INVENTION

1. Field of the Invention

The present invention relates to a method of producing zinc oxide powder.

2. Description

Zinc oxide is a consumption product frequently used in the ceramics, industrial rubber and tire industries, in the chemical and pharmaceutical fields and in the production of food supplements.

The method most frequently used for producing zinc oxide is the so-called "French" or "indirect" process, during which the oxide is produced from metallic zinc, by evaporation thereof in a crucible or in a distillation column, and then by oxidation of the fumes. According to the purity of the starting zinc, it is possible to obtain a more or less pure zinc oxide, in the form of fine particles having a nodular structure and a mean size (d50) of between 0.5 and 5 μm. These particles develop a relatively low specific surface, calculated according to the BET method, of around 3 to 10 $m^2/g$.

It is also possible to product zinc oxide by the so-called "American" or "direct" process. This method also produces the oxide from a volatilisation of zinc, followed by an oxidation of the fumes. However, this method makes it possible to process raw materials other than previously refined metallic zinc, by adding a reducing compound in the feed of the furnace used. The oxides obtained have a particle size and specific surface substantially similar to those obtained by the "French" process. These particles do however have an acicular structure that makes them unsuitable for use in several fields, in particular in the tire and rubber industry. The chemical purity of the powder obtained is also low, given the diversity of the nature of the raw materials processed.

Finally, hydrometallurgical processes are known (see for example W J Wendt, Ammonia, Ammonium Carbonate Leaching of Low Grade Zinc Ores, in Engineering and Mining Journal, 1953, vol. 154, pages 84-90; WO-98/36102, U.S. Pat. No. 2,147,379). These methods consist of drying and/or calcining a zinc hydroxide or zinc carbonate obtained by the precipitation of solutions of zinc salts (chloride, sulphate, hydrosulphite, ammoniacal complexes, etc). These methods are generally employed to reprocess by-products from the chemical industry or for processing zinc ore. According to various parameters, the zinc oxides produced in this way have relatively different properties and are often sold as zinc concentrates. The specific surfaces are very variable, from 3 to 80 $m^2/g$, with mean particle sizes that are difficult to control and may range up to more 100 μm. Despite all the purification steps designed up till now, the zinc oxides produced have undesirable chloride and sulphate contents. The application of these materials is therefore possible only sporadically or in certain niche sectors.

DETAILED DESCRIPTION

The aim of the present invention is to process large quantities of starting zinc oxide issuing from a hydrometallurgical processing as mentioned above without modifying the nodular crystalline structure thereof and so as to achieve reproducible particle sizes capable of being applied in applications in the rubber and tyre industry. In addition, there exists a need for a flexible method making it possible to achieve uniform but adjustable specific surfaces.

This problem is solved according to the invention by a zinc oxide powder production method comprising calcination of zinc carbonate, possibly basic, or a zinc hydroxide, with production of a starting zinc oxide in the form of particles with a nodular structure, slow cooling of said starting zinc oxide in air, formation of an aqueous pulp from said cooled starting zinc oxide, continuous wet grinding of this aqueous pulp using microballs moved in the pulp to be ground so as to impact on each other and shear it so as to obtain a zinc oxide with particles with a nodular structure having a granulometric distribution where the particles have a mean size (d50) of between 0.02 and 20 μm and a maximum size of 30 μm, separation of this ground pulp between a liquid phase and a solid phase containing the zinc oxide, and drying of said solid phase, coupled with a mechanical deagglomeration of the particles during drying, with the obtaining of a dry zinc oxide powder with particles with a nodular structure having said granulometric distribution.

The words "particles with a nodular structure" mean particles having a form the dimensions of which are substantially constant in the three planes in space (without preferential dimension). The words "particles with almost spherical structure" are sometimes also used to designate the aforementioned type of structure.

As mentioned previously, according to the invention, the starting zinc oxide issues from a hydrometallurgical processing of a raw material based on zinc. Through the method according to the invention, starting from non-refined starting materials, it is possible to directly manufacture ZnO with a nodular structure with characteristics identical to those obtained by the "French" (or indirect) process, the principal one of which is the particle size. In addition, by varying the calcination temperature, it is possible to act on the value of the specific surface according to requirements. The specific surface obtained after cooling is maintained throughout production.

Consequently, as is clear from above, the method according to the invention makes it possible to obtain a zinc oxide the particles of which have a nodular structure and a mean particle size appropriate for, for example, use in the rubber industry (which is the industry for which ZnO is mainly intended) whereas before the reference in the rubber industry was zinc oxide issuing from the French process. The zinc oxide issuing from a hydrometallurgical processing was, until the invention arrived, a marginal specification unusable for the majority of formulations.

Advantageously, in the dry powder obtained, the particles have a mean size (d50) of between 0.5 and 3 μm.

Figure 1:
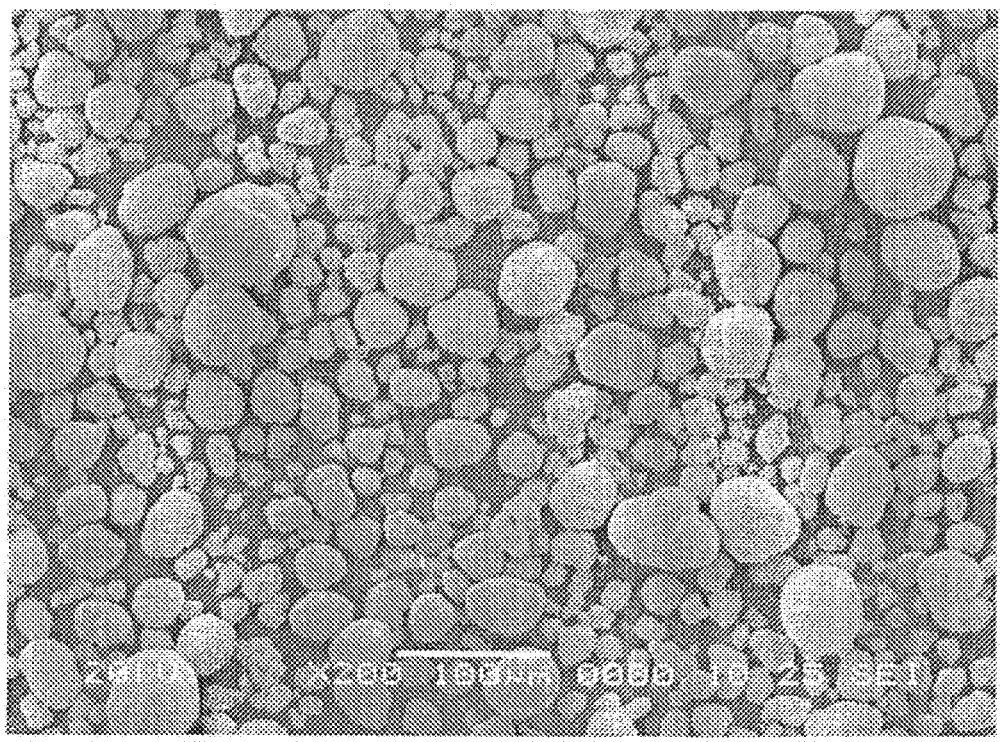
FIG. 1 shows a micrograph of basic zinc carbonate precipitate formed in the precipitation step of Example 1.

The method according to the invention thus makes it possible to achieve, from a zinc oxide the particles of which are coarse or variable in size, extremely fine particle sizes allowing applications of the powder obtained in the field of the rubber or tire industry, while maintaining a crystalline structure acceptable for these applications.

According to an advantageous embodiment of the invention, the method comprises a washing with water of the separated solid phase, with dissolution in the water of the soluble sulphates and chlorides present, the dry zinc oxide powder having a sulphate content <60 ppm and a chloride content <10 ppm.

When a high specific surface is required (for example around 40 m²/g), the zinc carbonate, for example basic, or the zinc hydroxide will be calcined at a temperature of approximately 300° C. and cooled slowly in air. If the specific surface must be around 5 to 15 m²/g, then the calcination temperature of the method according to the invention will be between 750° and 1200° C., preferably between 800° and 1000° C., in order to obtain a zinc oxide with a nodular structure that meets the rubber industry standards (BET≈5 to 15 m²/g).

Advantageously, according to the invention, the starting zinc oxide is prepared by calcination of a zinc hydroxide or carbonate precipitated in a zinc saline solution. A flash calcination makes it possible to obtain a controlled specific surface/particle size pair, these particles having a nodular structure. The grinding, solid/liquid separation and drying process according to the invention also offers the advantage of not modifying the BET specific surface obtained during calcination. During calcination, insoluble sulphates are modified in forms that are soluble in water.

Other embodiments of the method according to the invention are indicated in the accompanying claims.

As a starting zinc oxide, it is possible for example to provide a ZnO having the following particle sizes:

0.5 μm<d20<50 μm
1 μm<d50<100 μm
2 μm<d80<200 μm

The crystals have a nodular form. The zinc oxide advantageously comes from a hydrometallurgical treatment of a raw material containing zinc.

In a wet grinder, this starting zinc oxide is put in suspension in pure water or water with an organic dispersing agent compatible with ZnO added (in particular an organotitanate or an organozirconate, for example in the KR series from the firm Kenrich), so as to have a solid matter content of between 10% and 60% by weight. The grinder is advantageously of the horizontal microball type. In this, the suspension is moved by rotating mechanical parts that enable the balls to impact on each other and to shear the material to be ground. As a grinder of this type, it is possible to envisage for example the METSO Detrimill or Hosakawa Alpine Hydromill grinders. The diameter of the grinding balls is chosen according to the fineness of the particles to be achieved. The grinding advantageously takes place at temperatures below 70° C.

The grinding step is then followed by a separation between a liquid phase and a solid phase containing the zinc oxide. This filtration advantageously takes place on any type of filter enabling a filtration cake to be generated. The filtration cake can then be washed with water, which makes it possible to obtain a high purity of the ZnO with sulphate and chloride contents below 60 ppm and respectively 10 ppm. To separate the solid phase from the liquid phase, use will preferably be made of a filter press.

During drying, it is necessary to ensure that reagglomeration of the particles is prevented so as to preserve the size of the ground primary particles. It is possible for example to use for this purpose a deagglomerating flash dryer. In addition to supplying hot air, the dryer is provided for example with a rotor and blades turning at high speed in order to strike the agglomerated ZnO particles during filtration. For this purpose it is possible to use for example a dryer of the Ultrarotor type manufactured by the firm Jaeckering or of the flash spin type manufactured by the firm Anhydro. The residence times in the dryer will preferably be less than 5 seconds, at temperatures of 150° to 700° C., advantageously from 300° to 450° C.

In this way a dry ZnO powder is obtained having particles with a nodular crystalline structure, the specific surface of which has not been substantially modified. The size of the particles is advantageously as follows:

0.005 μm<d20<10 μm
0.02 μm<d50<20 μm
0.1 μm<d80<25 μm, with a maximum particle size of 30 μm.

The particles advantageously have a d20 of between 0.2 to 2.5 μm, a d50 of between 0.5 and 3 μm, and a d80 of between 1 and 10 μm. In this way, the particles obtained have a size distribution similar to that obtained for the ZnO particles issuing from the French process.

In a preferential embodiment, the method according to the invention also comprises a pelletisation or an enrobing, for example by means of an organic or mineral substance, in order to improve the properties of the zinc oxide thus formed. For example, by forming granules (pellets) using a granulator, the fluidity of the ZnO is improved whereas, by enrobing the ZnO with proprionic acid or proprionate, the ability of the ZnO to be incorporated in rubber is improved, for example by a spraying of proprionic acid or proprionate during the drying or granulation step.

The invention will be described in more detail, with the help of non-limitative examples.

EXAMPLE 1

An ammoniacal solution containing zinc in solution, which was obtained during a hydrometallurgical treatment of impure ZnO with various origins and the composition of which is given in table 1, is boiled by injecting steam. The result is an evaporation of a vapour containing water, ammonia and carbon dioxide, and the precipitation of a basic zinc carbonate (BZC).

TABLE 1

| Composition of the ammoniacal solution before precipitation | | |
|---|---|---|
| Element | | Grade |
| Zn | g/l | 135 |
| $NH_3$ | g/l | 120 |
| $CO_2$ | g/l | 85 |
| $SO_4$ | g/l | 4 |
| Cl | mg/l | 250 |
| Ca | mg/l | 190 |
| Mg | mg/l | 430 |
| Pb | mg/l | 1.9 |
| Cu | mg/l | 0.5 |
| Cd | mg/l | 0.5 |
| Fe | mg/l | 1.3 |
| Mn | mg/l | 0.5 |

The precipitation is carried out continuously in a series of four pressurised reactors, the steam being injected in counterflow to the solution. The residence time used is 60 minutes, and the steam flow is adjusted so as to evaporate 90% of the ammonia.

The pulp obtained contains 180 g/l of solid matter, principally basic zinc carbonate. The compositions of the liquid and solid obtained are given in the following table. The presence of sulphates in the solid indicates that there has been precipitation of compounds such as gypsum ($CaSO_4.2H_2O$) magnesium sulphate or basic zinc sulphate (BZS), or even the three together. These compounds are insoluble in water.

TABLE 2

Characterisation of the pulp issuing from the precipitation step

| Element | | Liquid | BZC |
|---|---|---|---|
| Zn | g/l or % | 6 | 58.5 |
| $NH_3$ | g/l or % | 12 | — |
| $CO_2$ | g/l or % | 25 | 25.4 |
| Cl | mg/l or ppm | 165 | 152 |
| $SO_4$ | mg/l or ppm | 2.9 | 2,000 |
| Ca | mg/l or ppm | — | 900 |
| Mg | mg/l or ppm | — | 2,000 |
| Pb | mg/l or ppm | — | <5 |
| Cu | mg/l or ppm | — | <2 |
| Cd | mg/l or ppm | — | <2 |
| Fe | mg/l or ppm | — | <5 |
| Mn | mg/l or ppm | — | <5 |
| LOI (1000° C.)* | % | — | 26.5 |

*Loss on ignition at 1000° C. for 2 hours.

The BZC crystals have the start of a nodular form and a mean particle size (d50) of around 34 μm (see in FIG. 1, a micrograph of the precipitate).

The pulp obtained after precipitation is thickened by settling up to 500 g/l of solids, and then rediluted with an aqueous solution containing 45 g/l of sodium carbonate. The dilution is done so as to obtain a pulp containing 250 g/l of solids. The addition of sodium carbonate redissolves part of the BZS and chlorides co-precipitated with the BZC so that the sulphate content in the solids after this operation is 300 ppm and the chloride content falls below the limit of 100 ppm.

The diluted pulp is then filtered in a membrane filter press, and the cakes washed with water. When washed with 2 m³ of water per tonne of dry solid, the efficacy of the washing of the soluble salts is 65%. After pressing at 15 bar, the filtration cake has the following characteristics:

TABLE 3

Characteristics of the BZC after filtration

| Moisture | % | 35 |
|---|---|---|
| BET specific surface | m²/g | 47 |
| Zn | % | 58.3 |
| SO4 Insoluble | ppm | 300 |
| Cl | ppm | <100 |
| Ca | ppm | 900 |
| Mg | ppm | 2,000 |

The filtration cakes are then calcined as they stand at 950° C. in a dryer/flash calcinator assembly. The solid obtained is a zinc oxide having the following characteristics:

TABLE 4

Characteristics of the zinc oxide

| Moisture | % | 0.22 |
|---|---|---|
| LOI (1000° C.) | % | 0.43 |
| d20 | μm | 16 |
| d50 | μm | 29 |
| d80 | μm | 48 |
| BET specific surface | m²/g | 5.7 |
| Zn | % | 79.4 |
| $SO_4$ | ppm | 1,600 |
| Cl | ppm | <100 |
| Ca | ppm | 1,200 |
| Mg | ppm | 2,700 |

Figure 2:
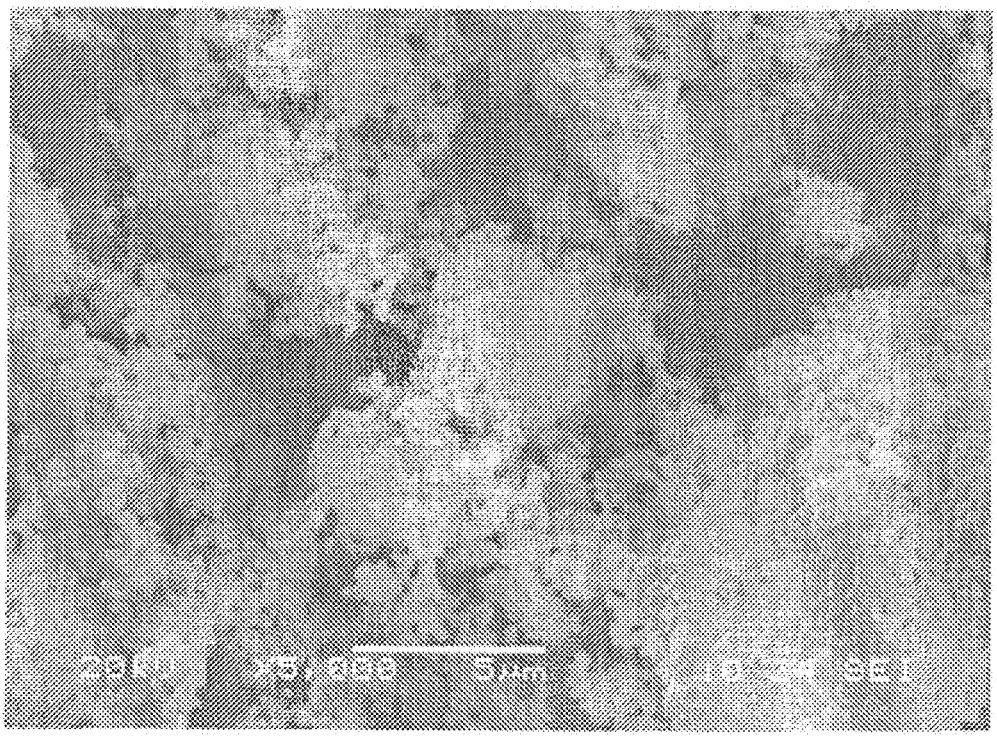
FIG. 2 shows a micrograph of zinc oxide particles after the calcination step of Example 1.

The zinc oxide particles have a nodular form and already contain a few microcrystals (see micrograph in FIG. 2).

The zinc oxide is next repulped in water so as to obtain a pulp with 40% solid matter. After pulping, the solids and liquids have the following respective compositions:

TABLE 5

Characterisation of the zinc oxide pulp before grinding

| Element | | Liquid | ZnO |
|---|---|---|---|
| Zn | g/l or % | 119 | 79.4 |
| $SO_4$ | mg/l or ppm | 1,065 | 15 |
| Ca | mg/l or ppm | 45.2 | 1,150 |
| Mg | mg/l or ppm | 107 | 2,664 |
| Cl | mg/l or ppm | 85 | <10 |

The pulp is ground in a Metso vertical ball grinder of the Detrimill type. The grinder is filled to 50% by volume with ceramic balls having a diameter of 2 mm. After 5 minutes of grinding, the product has the following granulometric distribution:

TABLE 6

Granulometric analysis of the ground zinc oxide

| Size (μm) | Total oversize (%) |
|---|---|
| 13 | 100 |
| 10 | 98 |
| 7 | 92 |
| 5 | 78 |
| 2 | 27 |
| d50 (μm) | 3.1 |

After grinding, the pulp is filtered in a membrane filter press and the cakes are washed with water using 3 m³/t of solids. This washing eliminates 90% of the chlorides and sulphates that have been made soluble by calcination. After pressing at 15 bar, the zinc oxide cake has a moisture content of 25% and contains 50 ppm of sulphates and <10 ppm of chlorides.

Figure 3:
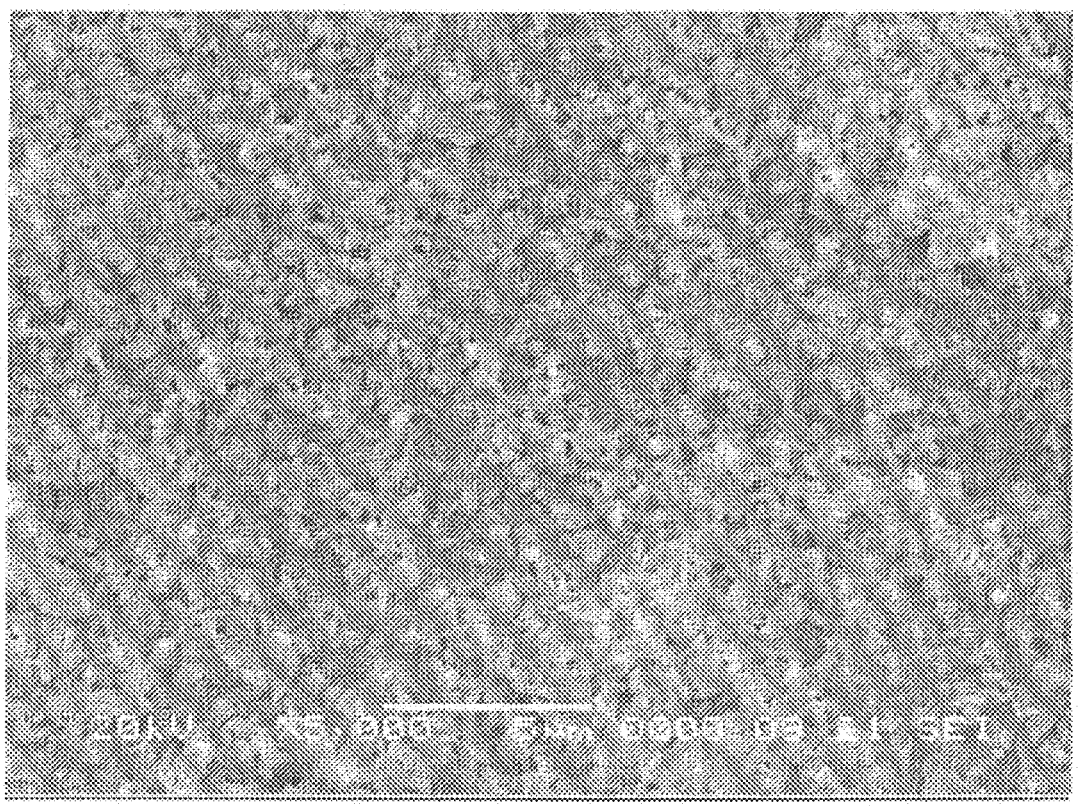
FIG. 3 shows a micrograph of microcrystals formed by the process of Example 1.

The cakes are then dried by means of a transported bed drier of the Ultrarotor type manufactured by Jaeckering. Granulometric analysis of the dry product showed no re-agglomeration of the product. Its BET specific surface is 6.2 m²/g. The nodular-shaped microcrystals are illustrated on the microphotograph in FIG. 3.

EXAMPLE 2

The sample used for this example comes from the dehydration/calcination of a zinc oxide issuing from the precipitation of a zinc hydrosulphite solution by neutralisation.

After calcination at 350° C., the zinc oxide has the following characteristics:

TABLE 7

| d20 | μm | 2.8 |
|---|---|---|
| d50 | μm | 9 |
| d80 | μm | 17 |
| BET specific surface | m²/g | 38.6 |

The sample is next repulped in water so as to obtain a pulp with 40% solids, and then the pulp is ground in a Hosokawa Alpine horizontal ball grinder of the hydromill type. The grinder is 85% by volume filled with ceramic balls having a diameter ranging from 0.7 to 1.2 mm. After 5 minutes of grinding, the product has the following granulometric distribution:

TABLE 8

| Size (μm) | Total oversize (%) |
|---|---|
| 10 | 100 |
| 7 | 99.5 |
| 5 | 97 |
| 2 | 68 |
| 1 | 28.5 |
| 0.5 | 10.3 |
| d20 (μm) | 0.8 |
| d50 (μm) | 1.5 |
| d80 (μm) | 2.2 |

After grinding, the pulp is filtered in a filter press, and then dried by means of a transported and agitated bed drier of the Ultrarotor type manufactured by Jaeckering. Granulometric analysis of the dried product showed no re-agglomeration of the product. Its BET specific surface is 40 m²/g.

EXAMPLE 3

The sample of ZnO used for this example came from the treatment as described in example 1. Its characteristics are as follows:

TABLE 9

| Size (μm) | Total oversize (%) |
|---|---|
| 10 | 99.7 |
| 7.7 | 96.7 |
| 5.1 | 74.2 |
| 2 | 6.1 |
| 1 | 0.8 |
| 0.5 | 0 |
| d20 (μm) | 2.6 |
| d50 (μm) | 3.9 |
| d80 (μm) | 5.5 |
| Specific surface (m²/g) | 7.1 |

The sample is re-pulped in water with an organic dispersing agent added (Kenrich type KR TTS) so as to obtain a pulp with 40% solids, and was then ground in a Netzsch horizontal ball grinder of the Zeta type. The grinder was 85% by volume filled with zirconium balls having a diameter ranging from 0.3 to 0.5 mm. After 30 minutes grinding, the product had a mean particle diameter (d50) of 60 nm.

It must be understood that the present invention is in no way limited to the embodiments described above and that many modifications can be made thereto without departing from the scope of the accompanying claims.

The invention claimed is:

1. Method of producing zinc oxide powder, comprising:
   calcination of zinc carbonate, basic zinc carbonate, or a zinc hydroxide, with production of a starting zinc oxide in the form of particles having a nodular structure,
   slow cooling of said starting zinc oxide in air,
   formation of an aqueous pulp of said cooled starting zinc oxide,
   continuous wet grinding of the aqueous pulp using microballs moved in the pulp to be ground so as to impact on each other and shear the pulp so as to obtain zinc oxide particles with a nodular structure having a granulometric distribution where the particles have a mean size (d50) of between 0.02 and 20 μm and a maximum size of 30 μm,
   separation of the ground pulp into a liquid phase and a solid phase containing the zinc oxide, and
   drying of said solid phase, coupled with a mechanical deagglomeration of the particles during drying, obtaining dry zinc oxide powder particles having a nodular structure and granulometric distribution.

2. Method according to claim 1, characterised in that, in the dry powder obtained, the particles have a mean size (d50) of between 0.5 and 3 μm.

3. Method according to claim 1, characterised in that the starting zinc oxide has a predetermined specific surface and in that the dry zinc oxide powder obtained has a substantially unchanged specific surface.

4. Method according to claim 1, characterised in that the aqueous zinc oxide pulp has a solid concentration of between 10% and 60% by weight.

5. Method according to claim 1, characterised in that the grinding comprises an addition of a dispersing agent to the pulp.

6. Method according to claim 1, characterised in that the said separation takes place by filtration with the formation of a filtration cake, as the solid phase.

7. Method according to claim 6, characterised in that the filtration takes place in a filter press.

8. Method according to claim 1, characterised in that the method further comprises washing of the separated solid phase and water, with dissolution in the water of soluble sulphates and chlorides present, the dry zinc oxide powder having a sulphate content <60 ppm and a chloride content <10 ppm.

9. Method according to claim 1, characterised in that, during the drying, the separate solid phase is subjected to the action of a flow of hot air having a temperature of 150° to 700° C. and simultaneously to the impact of elements driven in rotation by a rotor.

10. Method according to claim 9, characterised in that the drying lasts for less than 5 seconds.

11. Method according to claim 1, characterised in that the starting zinc oxide is prepared by calcination of a zinc hydroxide or zinc carbonate precipitated in a saline zinc solution.

12. Method according to claim 1, in which the calcination is performed at a temperature of between 300° C. and 1200° C.

13. Method according to claim 1, characterised in that the method also comprises
   an extraction of zinc from a raw material containing impure zinc oxide by means of an aqueous ammonia solution and ammonium carbonate so as to produce a lixiviation liquor containing zinc in solution, and
   a precipitation of basic zinc carbonate in said lixiviation liquor, this precipitated basic zinc carbonate being calcined, after liquid/solid separation.

14. Method according to claim 13, characterised in that the method also comprises, before the liquid/solid separation, a dilution of the lixiviation liquor, in which the precipitated basic zinc carbonate is situated, by an aqueous solution of sodium carbonate, with dissolution of co-precipitated sulphates and chlorides.

15. Method according to claim 13, characterised in that the method comprises a preparation of said raw material containing impure zinc oxide by treatment of zinc ore or industrial materials containing zinc.

16. Method according to claim 15, characterised in that said preparation comprises a washing of steelwork dust having high Zn content, a roasting of zinc sulphide concentrate or a recovery of fumed zinc oxide.

* * * * *